United States Patent [19]

Culp, III

[11] Patent Number: 4,916,328

[45] Date of Patent: Apr. 10, 1990

[54] ADD/SHED LOAD CONTROL USING ANTICIPATORY PROCESSES

[75] Inventor: Charles H. Culp, III, Mundelein, Ill.

[73] Assignee: Honeywell Inc., Minneapolis, Minn.

[21] Appl. No.: 282,097

[22] Filed: Dec. 8, 1988

[51] Int. Cl.⁴ .............................................. H02J 1/00
[52] U.S. Cl. ...................................... 307/39; 364/493
[58] Field of Search .................... 307/39, 38; 364/492, 364/493

[56] References Cited

U.S. PATENT DOCUMENTS

| | | | |
|---|---|---|---|
| 3,602,703 | 8/1971 | Polenz | 364/492 |
| 4,463,432 | 7/1984 | Carter, II | 307/39 X |
| 4,510,398 | 4/1985 | Culp et al. | 307/39 X |
| 4,583,182 | 4/1986 | Breddan | 307/39 X |

Primary Examiner—William M. Shoop, Jr.
Assistant Examiner—Sharon D. Logan
Attorney, Agent, or Firm—Donald J. Lenkszus

[57] ABSTRACT

There is disclosed an add/shed system and method for adding and shedding loads to maintain the power consumption of a building below the predetermined level. The system includes a plurality of loads and measures the present total power consumption of the building. Selected ones of the loads are reactively shed in response responsive to the measured total power consumption of the building to maintain the present power consumption of the building below the predetermined level. The anticipated future increase or decrease in power consumption of the building is determined and selected ones of the loads are added or shed in response responsive to the measured total power consumption of the building and the anticipated future increase or decrease in power consumption of the building for continuously maintaining the power consumption of the building below the predetermined level.

32 Claims, 6 Drawing Sheets

ADD/SHED LOAD CONTROL USING ANTICIPATORY PROCESSES

BACKGROUND OF THE INVENTION

The present invention relates to a system for maintaining power consumption below a predetermined level and, more particularly, to an add/shed control which utilizes anticipatory processes for maintaining power consumption below a predetermined level where the loads can be shed based upon anticipated future increases in power consumption.

Power utilities charge their customers according to a policy which is designed both to encourage energy conservation and to assess the cost for the extra power generating equipment which they must acquire and maintain to meet peak demands against those creating the peak demand. As a result, these power utilities will typically charge their customers at a first rate for power consumed below a first level, and at a second rate for power consumed between the first level and a second level. If power consumption should exceed the second level, the utilities will charge what is in effect a penalty for the acquisition and maintenance of the extra power generating equipment required to meet these periods of unusually high demand. In addition, many utilities will charge at the higher rates for all power consumed for a period of, for example, a year, if the power demand increases at any time to above the second level.

In order to avoid these peak demand charges imposed upon them by their power utilities, power consumers have employed automatic control systems which monitor power consumption within their facilities and which control the energization state of the power consuming loads within their facilities to maintain power consumption below some predetermined value in order to reduce the extra charges which would otherwise be imposed upon them during peak demand periods or intervals. These systems have typically taken the form of add/shed control systems which are designed to shed loads as power consumption approaches a predetermined level which is established by the customer. Alternatively, as power consumption begins to fall away from this predetermined level, previously shed loads can be added back on-line so that they may be utilized by the customer.

Several different types of add/shed control systems have been utilized in the past. For example, the most common type of add/shed control system established a prioritized load order wherein the load having the lowest priority will be shed first and the load having the highest priority will be shed last. In such a system, if loads can be added back on-line, the load having the highest priority will be added first and the load having the lowest priority will be added last.

Another add/shed system which is known adds and sheds loads on the basis of comfort fairness. That is, the loads associated with zones having conditions closest to set point will have the lowest priority and loads associated with zones having conditions the furthest away from set point will have the highest priority. In this type of system, the loads having lowest priority will be shed first and the loads having the highest priority will be shed last on the basis that it is more fair to shed loads associated with the zones being closest to the comfort range first.

Unfortunately, these systems have been inflexible because rarely can all the loads within a building be made to fit within one of these types of add/shed routines. For example, it is more desirable to shed the air handling fan systems within the building according to a comfort fairness routine than according to a sequential routine because a sequential routine is a fixed routine and will not necessarily result in fair control of the air handling fan systems. On the other hand, the outdoor lights certainly would not be shed on the basis of comfort fairness and it may also be determined that the outdoor lights are all of equal priority so that they could not be prioritized according to a sequential routine. Thus, the outdoor lights may be shed rotationally so that the first shed will be the first added.

As a result, a new and improved add/shed load control was developed by the assignee of the present invention and is fully disclosed in U.S. Pat. No. 4,510,398 which is assigned to the assignee of the present invention. In this system, an add/shed control is provided for maintaining power consumption below a predetermined level where the loads can be added and/or shed in different sequences depending upon the prioritization level given to each load and upon the add/shed sequence assigned to each prioritization level.

While the add/shed control disclosed in the aforementioned U.S. Pat. No. 4,510,398 adds flexibility to such systems, there remains substantial room for improvement. For example, the foregoing system does not provide for determining the anticipated future increase or decrease in power consumption of the building and, as a result, is unable to predict which loads must be shed in order to maintain the power consumption of a building below a predetermined level when future loads are to come on line. Hence, all of the add/shed control systems previously described are reactive systems which can only react to existing circumstances and are unable to maintain power consumption of a building below a predetermined level on a continuous basis based upon known future increases or decreases in power consumption.

In addition to the foregoing, such systems usually include a plurality of loads which are under control of "application packages" which control these loads based upon a predetermined on and off schedule. When one of the loads assigned to an application package is to come on line, the system can only react to the load coming on line which may cause the power consumption of the building to instantaneously exceed the desired predetermined level. It would therefore be advantageous in the art to have a system which could shed loads in anticipation of a load coming on line under control of an application package and to delay the load from coming on line until enough load can be shed to maintain the total power consumption of the building below the predetermined level when the load does in fact come on line.

It is therefore a general object of the present invention to provide a new and improved add/shed control system and method for adding and shedding loads to maintain the power consumption of a building below a predetermined level.

It is another object of the present invention to provide such an add/shed system and method which can determine in advance the future increase or decrease in power consumption of a building and which is capable of shedding enough load to accommodate the future increases in power consumption without exceeding the predetermined power consumption level.

It is a still further object of the present invention to provide such a system and method which can delay the on time of a load until enough load is shed to permit the load to come on line without increasing the power consumption above the predetermined level.

SUMMARY OF THE INVENTION

The invention therefore provides an add/shed system for adding/shedding loads to maintain the power consumption of a building below a predetermined level. The system includes a plurality of loads and measuring means for measuring the present total power consumption of the building. The system further includes first means for shedding selected ones of the loads responsive to the measured present total power consumption of the building to maintain the present power consumption below the predetermined level and second means for determining the anticipated future increase or decrease in power consumption of the building and for adding/shedding selected ones of the loads responsive to the measured present total power consumption of the building and the anticipated future increase or decrease in power consumption of the building for continuously maintaining the power consumption of the building below the predetermined level.

The invention also provides an add/shed system for adding loads by an ON command for each load and shedding loads by an OFF command for each load to maintain the energy consumption of a building below a predetermined level, wherein each load is assigned to at least one of multiple types of add/shed routines, and wherein each routine controls the adding and shedding of the loads in a different sequence. The system includes a plurality of loads, and processor means connected to the plurality of loads and adapted to be connected to a power meter for determining which of the plurality of loads should be added or shed to maintain the energy consumption of the building below the predetermined level. The processor means is arranged for determining which type of the multiple types of add/shed routines is assigned to each load and includes means for adding or shedding each load according to its assigned routine. The processor means also includes means for determining in advance of a load ON command for a given load when the adding of the given load will cause the energy consumption of the building to increase above the predetermined level.

The present invention also provides a method of adding/shedding selected ones of a plurality of loads to maintain the power consumption of a building below a predetermined level. The method includes the steps of measuring the total power consumption of the building, reactively shedding selected ones of the loads responsive to the measured present total power consumption of the building to maintain the present power consumption of the building below the predetermined level, determining the anticipated future increase or decrease in power consumption of the building, and predictively adding/shedding selected ones of the loads responsive to the measured present total power consumption of the building and the anticipated future increase or decrease in power consumption of the building to continuously maintain the power consumption of the building below the predetermined level.

BRIEF DESCRIPTION OF THE DRAWINGS

The features of the present invention which are believed to be novel are set forth with particularity in the appended claims. The invention, together with further objects and advantages thereof, may best be understood by making references to the following description taken in conjunction with the accompanying drawings in the several figures of which like reference numerals identify like elements, and wherein:

DESCRIPTION OF THE PREFERRED EMBODIMENT

Figure 1:
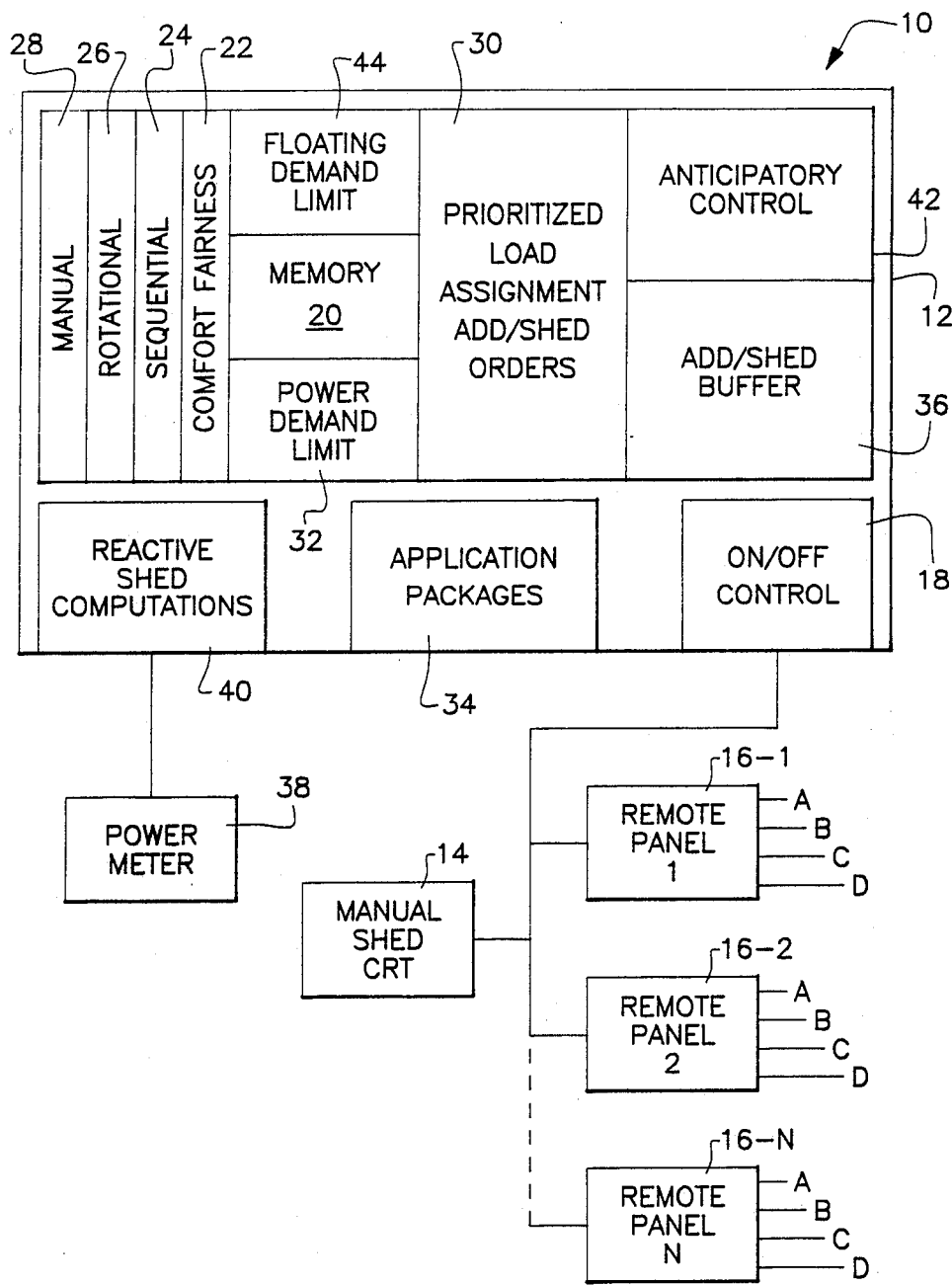
FIG. 1 is a functional block diagram of an add/shed control system embodying the present invention.

Referring now to FIG. 1, it shows, in functional block diagram form, an add/shed control system 10 embodying the present invention. The system 10 includes an add/shed processor 12, a manual shed CRT 14, and a plurality of remote panels 16-1 through 16-N.

Each remote panel can control, for example, four loads A-D. In such a system, if the add/shed processor 12 wishes to turn off load D associated with remote panel 16-N, the processor would construct a message addressing remote panel 16-N and instruct that panel to turn off load D through ON-OFF control portion 18. The remote panels 16-1 through 16-N can be provided in any of the Delta systems manufactured and sold by Honeywell, Inc.

The add/shed processor 12 is provided with a memory 20 which is arranged to control the loads associated with the remote panels according to one of a plurality of add/shed routines. These add/shed routines may be a comfort fairness routine 22, a sequential routine 24, a rotational routine 26 and a manual routine 28. When controlling the loads utilizing the routines 22, 24 and 26, the system is under automatic control and when the loads are controlled by routine 28, the system is under manual control. As will be appreciated by those skilled in the art, three automatic routines have been disclosed herein for completeness and that any number of automatic routines may be utilized without departing from the present invention.

The processor 12 also includes a prioritized load assignment add/shed orders section 30 which contains a plurality of shed orders for the system. The section 30 provides flexibility to the system wherein each routine 22, 24, 26, and 28 is assigned to at least one or perhaps more of the shed orders provided in section 30. Each load controlled by the remote panels 16-1 through 16-N is then assigned to one of the shed orders. The table below provides an example as to how the routines may be assigned to the shed orders.

| Shed Order 1 | Rotational |
| Shed Order 2 | Sequential |
| Shed Order 3 | Comfort Fairness |
| Shed Order 4 | Rotational |
| Shed Order 5 | Sequential |
| Shed Order 6 | Comfort Fairness |
| Shed Order 7 | Rotational |
| Shed Order 8 | Sequential |
| Shed Order 9 | Comfort Fairness |
| Shed Order 10 | Rotational |
| Shed Order 11 | Sequential |

| | |
|---|---|
| Shed Order 12 | Comfort Fairness |
| Shed Order 13 | Rotational |
| Shed Order 14 | Sequential |
| Shed Order 15 | Comfort Fairness |
| Shed Order 16 | Rotational |
| Shed Order 17 | Sequential |
| Shed Order 18 | Comfort Fairness |
| Shed Order 19 | Rotational |
| Shed Order 20 | Sequential |
| Shed Order 21 | Comfort Fairness |
| Shed Order 22 | Manual |

As can be noted from the table above, there are 22 total shed orders. Twenty-one of these shed orders are for automatic control and one shed order is for manual control. The automatic control shed orders are arranged in groups of seven with each group including a rotational, sequential, and comfort fairness routine. A lesser number or greater number of shed orders may be employed in practicing the present invention depending upon the size of the total system including the number of loads to be controlled and the number of different types of automatic control routines. For example, if only rotational and sequential automatic control routines are utilized, the system can be arranged to include fourteen automatic shed orders and one manual shed order to provide a total of 15 shed orders.

In assigning loads to the shed orders, the loads having the lowest priority are preferably assigned to the lower numbered shed orders. As will be seen hereinafter, the control system sheds loads from the lower shed orders to the higher shed orders. As an example, if it is decided that a group of loads should have the lowest priority and should be shed sequentially, these loads should then be assigned to Shed Order 2. Not all shed orders need to be assigned loads. In the above example, Shed Order 1 will have no loads assigned to it. Hence, from the foregoing, it can be appreciated that Shed Order 1 is the first level to be shed and so on with Shed Order 21 being the last order to be shed. Shed Order 22 will be discussed hereinafter. If no loads are assigned to Shed Order 1, the system will simply skip to Shed Order 2 for shedding any loads which have to be shed.

The rotational routine is similar to a first shed, first added routine. That is, when any load can be added back on line, the load which was first shed will be the load first added. This routine can also be used to even out the shedding and adding of loads. For example, if there are three loads assigned to Shed Order 1, but only the first two loads are shed and then added back on line, the next time loads have to be shed, the system will begin with load 3.

The sequential routine operates on the principle that all loads in a shed order to which is assigned a sequential routine are prioritized within the shed order. Thus, the load which is first shed is the load having the lowest priority within the level. On the other hand, the load which is first added is the load last shed, that is, of the loads which were previously shed, the first load that will be added will be the load having the highest priority.

The comfort fairness routine is a floating type of sequential routine in nature. That is, the loads within the shed order are prioritized but they are prioritized on the basis of comfort fairness rather than a predetermined sequence. Comfort fairness prioritization dictates that the loads associated with the zone being closest to set point will have the lowest priority and loads associated with zones being farthest away from set point will have the highest priority. Thus, it is more desirable to shed loads associated with zones which are most near comfortable conditions than loads associated with zones being the farthest away from comfortable conditions.

Finally, the manual shed order routine at Shed Order 22 requires that the human operator take action to indicate which loads assigned at this shed order level should be shed. Along these lines, therefore, manual shed CRT 14 is provided so that the loads assigned to Shed Order 22 can be displayed if all of the loads assigned to Shed Orders 1 through 21 have been shed and if power consumption is still threatening to exceed the power demand limit established within memory section 32.

The aforementioned U.S. Pat. No. 4,510,398 includes a complete description as to how loads can be shed according to the shed orders previously described. Reference may be had to U.S. Pat. No. 4,510,398 for this description. Accordingly, the disclosure of U.S. Pat. No. 4,510,398 is incorporated herein by reference.

In a typical system, not all of the loads to be controlled need be controlled by one of the routines 22, 24, 26, and 28. One or more of the loads will be controlled by the application packages section 34 which provides a predetermined schedule as to when the loads under control of the application packages should be turned on and turned off. The application packages section 34 in this regard may provide the predetermined schedule taking into account such parameters as maximum off times, minimum off times, optimum duty cycle, etc. As will be more fully described hereinafter, when the application packages section 34 desires to turn a load on or off through the ON/OFF control 18, it will post a request to that effect with the add/shed buffer 36. This enables the processor 12 to anticipate when the loads under the control of the application packages section 34 are desired to come on line or go off line.

In adding and shedding loads to maintain the total power consumption below a predetermined level, it is preferred that the system shed loads when the power consumption reaches a second predetermined level which is less than the predetermined level and add loads when the total power consumption falls below a third predetermined level which is less than the second predetermined level. As a result, the total power consumption of the building at any one time will be between the second and third predetermined levels which are both less than the predetermined level. This not only assures that the power consumption will remain below the predetermined level, but in addition, adds necessary historisis to the system to assure proper power consumption maintenance without abrupt discontinuities. The second and third predetermined power consumption limits or levels are stored in the power demand limit section 32 of processor 12 and are used for making comparisons to determine whether a load should be added or shed during the operation of the system.

To determine whether loads should be added or shed, the processor 12 is connected to a power meter 38 so that the processor 12 can read the current power consumption. Although any type of power meter can be used, the power meters supplied utilities are adequate for the purposes of processor 12. These meters will typically provide KW pulses which are indicative of power consumptions and end of interval synchronization pulses to indicate the intervals over which power measurements are made. As will be seen in the flow charts hereinafter, the system adds and sheds loads during each of a plurality of successive discreet time intervals. These time intervals can range between, for example, one to three minutes. However, intervals shorter than one minute and longer than three minutes may also be appropriate under certain conditions.

Figure 2:
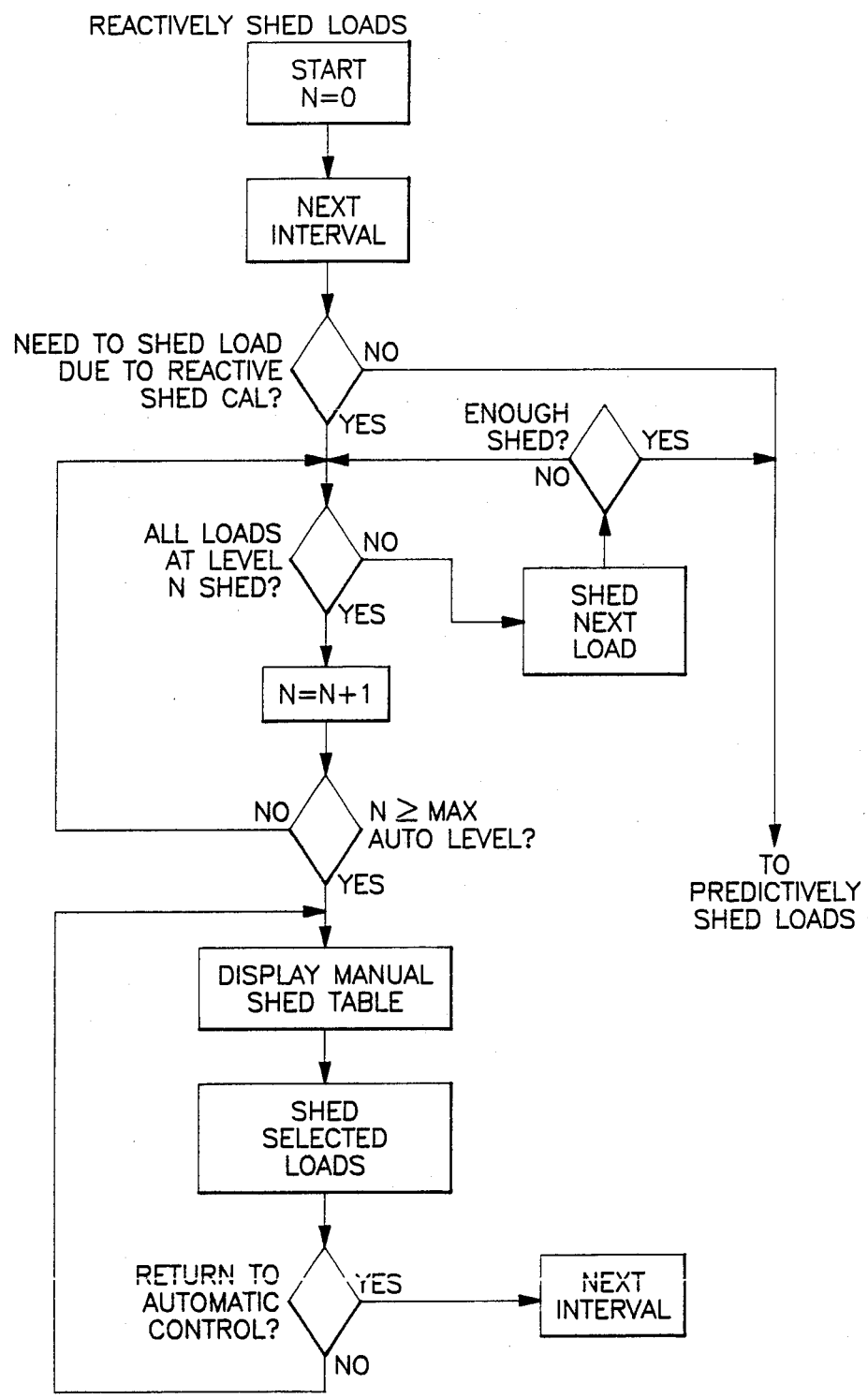
FIGS. 2 through 4 are flow charts for controlling the adding/shedding of the loads in accordance with the present invention.
Figure 3:
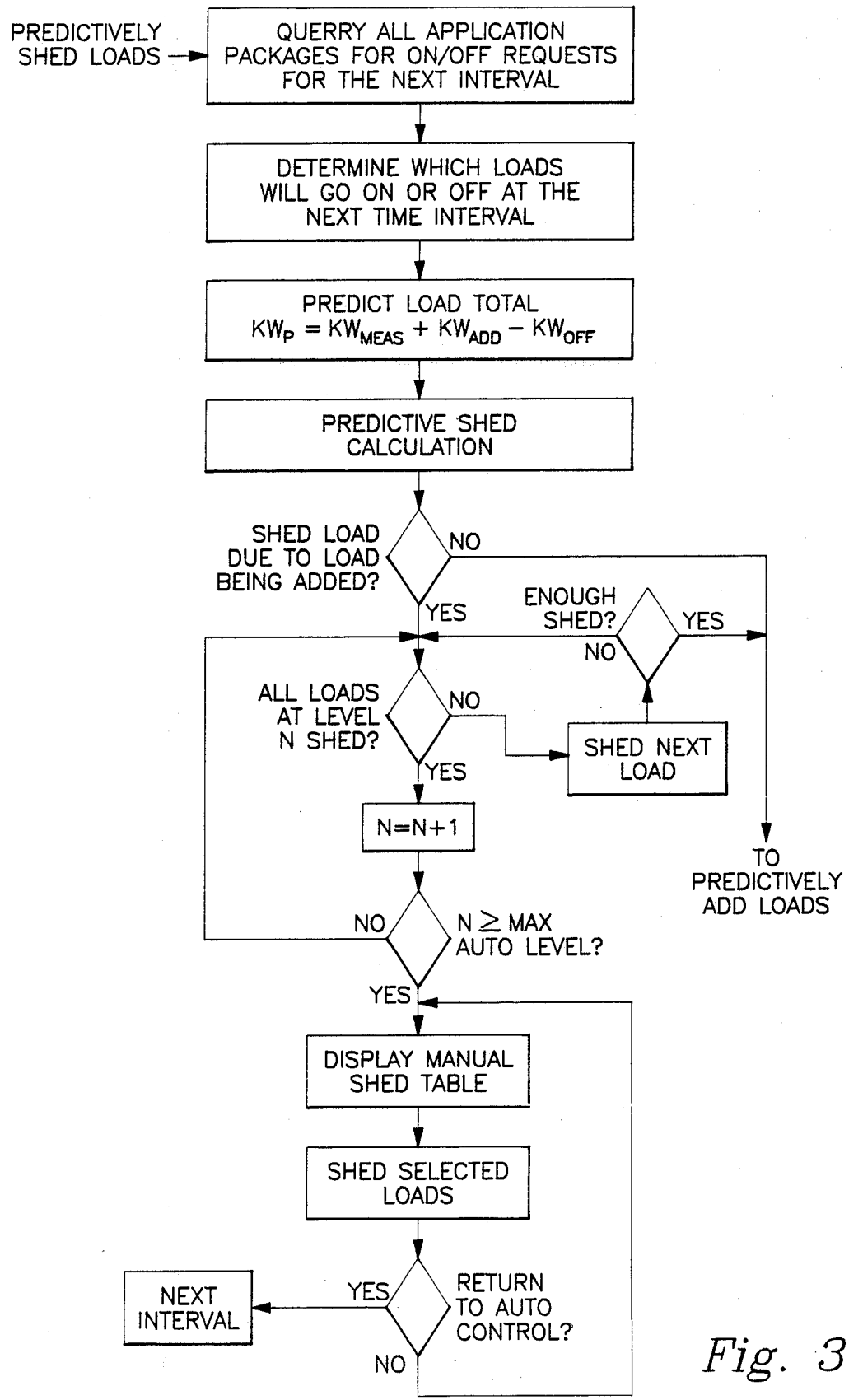
Figure 4:
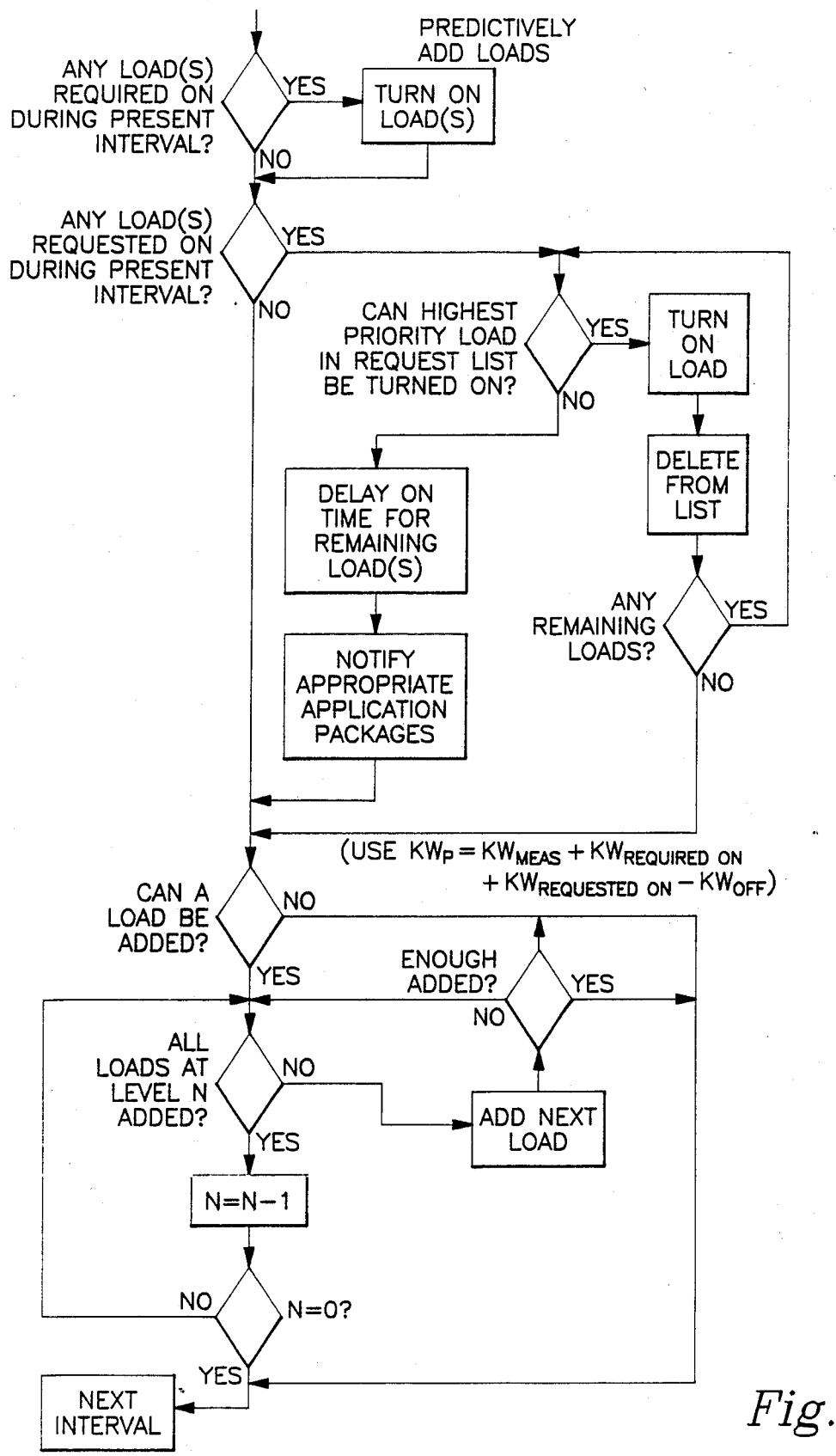

In accordance with the present invention, and as will be noted by the flow charts of FIGS. 2-4, the system, during each time interval, goes through a reactive shed stage wherein loads may be shed based upon current power consumption levels and then goes through predictive stages to predictively shed loads and then predictively add loads. In accordance with the preferred embodiment of the present invention, the system during the predictive stages sheds and adds loads based upon information obtained during the immediately preceding time interval. In accordance with the alternative embodiment illustrated in the flow chart of FIG. 6, the system could be arranged to predictively shed and add loads based upon information obtained during a current or present time interval.

In order to reactively shed loads, the processor 12 includes a reactive shed computations section 40 wherein the current power consumption is compared against the second predetermined level to determine whether loads should be reactively shed. To predictively shed and add loads, the processor 12 includes an anticipatory control section 42. The section 42 is arranged to query the add/shed buffer 36 for on and off requests from the application packages section 34 to calculate the predicted power consumption level. In accordance with the preferred embodiment, the predicted power consumption calculated by the anticipatory control section 42 is the predicted power consumption level for the next successive interval and, in accordance with the alternate embodiment, the predicted power level is the predicted power consumption level for a current time interval.

Before describing the operation of the add/shed control system 10 as illustrated in the flow charts of FIGS. 2-6, it may also be mentioned that the processor 12 also includes a floating demand limit section 44 which may be utilized to increase energy savings by providing a further demand limit which is lower than the predetermined power demand limit so that certain non-essential loads can be shed for the express purpose of lowering energy costs regardless of whether the power consumption approaches the power demand limit. In such a case, the floating demand limit section is provided in order to shed the loads assigned to a preselected number of shed orders. For example, as power consumption approaches the floating demand limit, the loads assigned to the first nine shed orders can be shed to maintain power consumption below the floating demand limit. If power consumption continues to increase above this limit, the floating demand limit floats upwards so that no other loads assigned to shed orders 10-22 will be shed. However, when the floating demand level approaches the power demand limit, the remaining loads assigned to shed orders 10-22 are eligible for shed.

Referring now to the flow charts of FIGS. 2-4, each time an add/shed interval is entered, such as on power up, the value N, which represents the shed order, is set to zero. The system will then determine, as shown in FIG. 2, whether any loads have to be reactively shed. In other words, the processor will read the current power consumption in the present time interval and compare it to the second predetermined power consumption limit or in other words the power consumption shed limit. If no loads should be shed, the processor will move forward to the predictive shed stage.

If loads have to be shed, the processor will determine whether or not all loads at the level N, which was initially set to zero, have been shed. Since there is no shed order zero, the answer must be that all loads at this order have been shed. N is accordingly incremented to 1 and the system will then determine if all loads at this shed order have been shed. If they have not, the processor will shed the load according to the procedure shown in FIG. 5. After the load has been shed, the processor will test whether or not enough load has been shed. If enough load has been shed, the system will then move forward to the predictive shed stage.

If enough load has not been shed, the processor will then test to determine whether there are any more loads at that level to be shed. If all loads at that level have been shed, the processor will increment to the next level by adding one to the old value for N and test whether the new N value is less than the maximum automatic shed level number, which, in this embodiment, is 21. If the N value is less than 21, the system will determine whether or not there are any loads at that level to be shed. If there are current loads remaining at that level to be shed, the system will shed the next load and test whether or not enough load has been shed.

During this procedure, two circumstances will eventually evolve. If enough load has been shed prior to reaching shed level 22, the system will move forward to the predictive shed stage. On the other hand, if enough load has not been shed and the system reaches shed order 22, and if more loads still need to be shed, the system will display the loads which can be manually shed on the manual shed CRT 14. The operator then has the option to shed whichever loads he chooses. After shedding the selective loads, the operator then determines whether the system should return to automatic control. If he determines that the system should return to automatic control, the system will pause and wait for the beginning of the next interval. If the operator determines that the system should not return to automatic control due to extremely high power consumption levels, the system will return to display the loads which can still be manually shed on the manual shed CRT 14.

If the system moves forward to the predictive shed stage, the value of N should be 21 or less. Upon entering the predictive shed stage, the processor will query all application packages for on and off requests for the next time interval. As previously described, the application packages section 34 of processor 12 will typically control a plurality of the loads in the system. When the application packages section 34 desires to turn a load on or off, it first posts a suitable on or off request in the add/shed buffer 36. At this stage of the process, the processor through the anticipatory control 42 accesses the add/shed buffer 36 to determine if any such on or off requests have been posted therein by the application packages section 34. Upon accessing the add/shed buffer 36, the processor determines which loads will go on or off during the next time interval. It will also determine the amount of power consumption represented by the loads which are requested to be turned on or off by the application packages section 34. Such power consumption data may be stored in the memory 20 or in the add/shed buffer 36.

The processor will then predict the anticipated power consumption of the system for the next time interval. It will do so by reading the current power consumption and adding to it the power consumption of the loads which are requested or required on during the next time interval and subtracting the power consumption of the loads which are to be turned off during the next time interval.

The processor will then determine whether any loads have to be shed due to the loads to be added during the next time interval. If no loads need to be shed predictively due to the loads to be added during the next time interval, the processor will move forward to the predictive add stage.

If loads need to be shed due to loads being added during the next time interval, the processor will then determine whether all loads at the present shed order have been shed. If not, the processor will then predictively shed the next load in accordance with the procedure shown in FIG. 5 and determine whether enough load has been shed. If enough load has been shed, the processor will move forward to the predictive add stage. If enough load has not been shed, the system will once again determine whether all loads at the current shed order have been shed. If all loads at the current shed order have been shed, the system will increment the shed order number by one. The system then determines whether the new current shed order level number is greater than the maximum number of automatic shed order levels. If it is not, the process repeats itself by determining whether all levels at the new incremented shed order level have been shed. If the new shed order level is greater than the maximum number of automatic shed order levels, in this preferred embodiment 21, then the system will enter into the manual mode by displaying those loads which can be shed manually on the manual shed CRT 14. Selected ones of the manually controlled loads will then be predictively shed in the same procedure as described with respect to the flow chart of FIG. 2.

From the foregoing flow chart of FIG. 3, it can be noted that the system predictively sheds loads to accommodate loads which are to be added during the next time interval. The loads to be added during the next time interval are determined during the present time interval. As a result, the system is capable of anticipating future increases in power consumption and accommodating such increases by predictively shedding loads to assure that the total power consumption of the system during the next time interval will not exceed the predetermined power consumption limit.

If enough load has been predictively shed without reaching the manual shed order level, the system will move forward to the predictive add stage shown in FIG. 4. The system will predictively add loads by first determining whether any loads are required to be turned on during the present interval. These loads were determined to be required on during the time period immediately preceding the present interval. If any loads are required to be turned on during the present interval, the system will turn on those loads.

If no loads are required on during the present interval, the processor will then determine whether any loads have been requested to be turned on during the present interval by the application packages section 34. If there has been such a request, the processor will determine whether the highest priority load in the request list posted by the application packages section 34 can be turned on. In making this determination, the processor compares the present measured power consumption to the third level which is the add load level.

If the highest priority load can be turned on, the system will turn on the load and delete that load from the posted list. The system will then determine whether any loads remain on the posted list. If loads requested to be turned on remain on the list, the system will then determine again whether the highest priority load remaining on the list can be turned on.

If originally the system determined that the highest priority load on the request list cannot be turned on, the system will delay the turning on of the load and notify the appropriate application package within the application packages section 34 that the on time is being delayed. The ON request will not be deleted from the list and, during the next time interval, the system will once again determine whether the loads requested to be turned on can be turned on.

If there were originally no loads requested to be turned on, if no loads requested to be turned on could be turned on, or if there were no loads remaining on the list to be turned on, the system will then determine whether one of the loads subject to control by a shed order can be added. In making this determination, the processor utilizes the anticipated or predicted power consumption for the next time interval which equals the measured current power consumption plus the power consumption of the loads required or requested on during the next time interval minus power consumption of the loads which are to be turned off during the next time interval. If a load cannot be added, the system will then pause until the beginning of the next time interval.

If a load can be added, the system will then determine whether all loads at the current shed order level have been added. If not, the system will add the next load and then determine whether enough load has been added. If enough load has been added, the system will pause and await the beginning of the next time interval. If enough load has not been added, the system will once again determine if all loads at the current shed order level have been added. If all loads at the current shed order level have been added, the system will then decrement the current shed order level number by one.

The system then determines whether shed order level number N is equal to zero. If it is, this indicates that there are no loads remaining to be added and the system pauses and awaits for the next time interval to begin. If the shed order level N is not equal to zero, the system then returns to determine whether all loads at the current shed order level have been added. When enough load has been added, or when there are no loads remaining to be added, the system pauses and awaits the next time interval.

As can be noted from the foregoing, during each time interval, the system determines whether it should reactively shed loads based upon the present power consumption and then determines whether loads should be predictively shed or added based upon the present total power consumption and the anticipated future increase or decrease in power consumption for the next time interval. The reactive shedding accommodates uncontrolled loads which are not under the control of the shed orders or the application packages section of the processor. As a result, if an uncontrolled load should go on to threaten the power consumption level rising above the predetermined level, the system will shed enough controlled loads to preclude the total power consumption to exceed the predetermined level. In providing the predictive shedding and adding of loads, the system is capable of shedding enough load to accommodate loads which are to be added during the next time interval. In addition, if loads can be added, they will be added based upon anticipated decreases in the power consumption for the next time interval. As a result, the system reactively sheds and predictively sheds and adds loads to continuously maintain the power consumption below the predetermined level.

Figure 5:
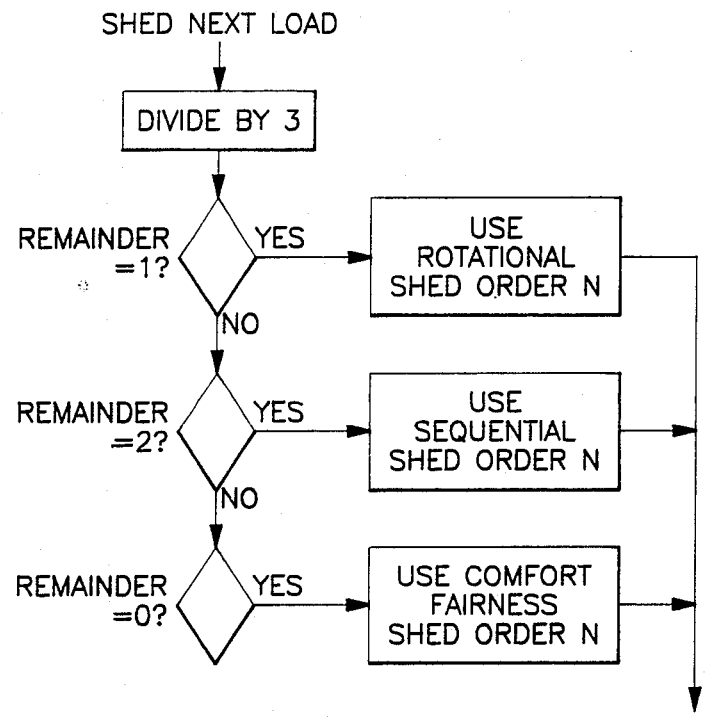
FIG. 5 is a flow chart for determining which add/shed routines apply to which loads.

The "shed next load" routine is shown in FIG. 5. If the next load is to be shed, processor 12 will divide the value of N by the number of different automatic routines established by the system, which is three in accordance with this preferred embodiment. If there is a remainder of one, then the rotational shed routine is utilized. If the remainder is two, the sequential shed routine is utilized. If there is no remainder, the comfort fairness routine is used. According to the process shown in FIG. 5, all shed orders in the series 1, 4, 7, etc. will be assigned to the rotational routine, all shed orders in the series 2, 5, 8, etc. will be assigned to the sequential routine, and all shed orders which are even multiples of three will be assigned to the comfort fairness routine. The rotational and sequential routines both involve predetermined sequences. The comfort fairness routine involves a variable sequence and may be similar to the routine described in U.S. Pat. No. 4,337,401. Although it is not shown, the "add next load" routine will be similar to that shown in FIG. 5.

Figure 6:
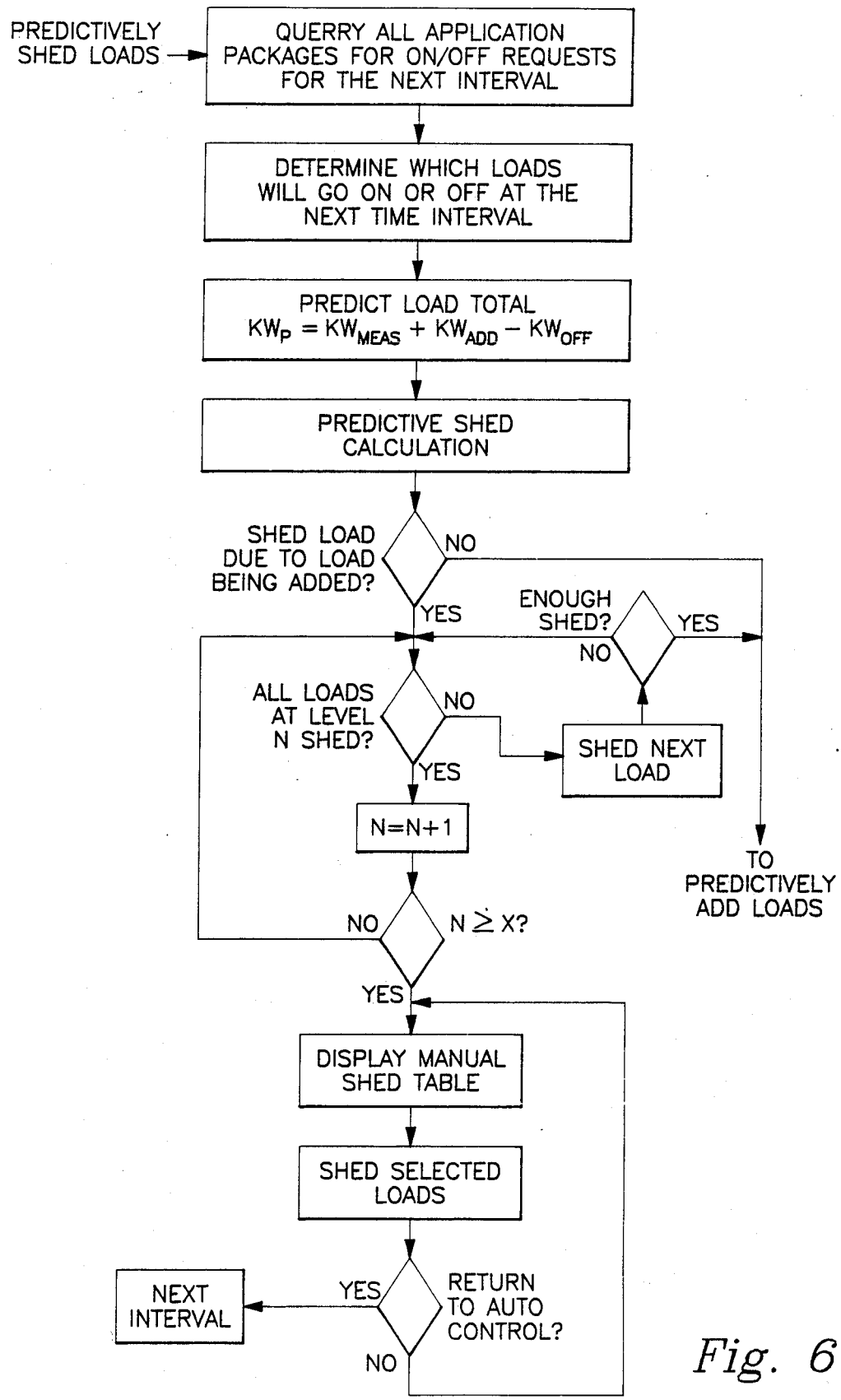
FIG. 6 is a flow chart for predictively shedding loads in accordance with an alternative embodiment of the present invention.

Referring now to FIG. 6, it illustrates a flow chart for predictively shedding loads in accordance with an alternative embodiment of the present invention. The flow chart of FIG. 6 can be substituted for the flow chart of FIG. 3.

In accordance with this alternate embodiment, the system predictively sheds loads by first querying all application packages for on or off requests for the present interval. The system then determines which loads will go on or off during the present time interval and determines anticipated or predicted power consumption of the system based upon the currently measured power consumption plus the power consumption of the loads to be added during the present interval minus the power consumption of the loads to be turned off during the present interval. The system, in the anticipatory control 42, then calculates the predicted power consumption and then determines whether loads should be shed and which loads should be added during the present interval based upon the power consumption increase or decrease predicted for the present interval. In all other respects, the processor operates the same as shown in FIG. 3.

As will be noted from this alternative embodiment, the system is arranged for reactively shedding loads based upon power consumption in a present time interval and is arranged for shedding and adding loads during the present interval based upon anticipated power consumption decreases or increases determined in the present time interval. As a result, while the system of the preferred embodiment looks ahead to the next time interval for making the anticipated power consumption determination, the system in accordance with the alternative embodiment looks to the present interval for making the anticipated power consumption determination.

As can be seen from the foregoing, the present invention provides a new and improved add/shed system for adding and shedding loads to maintain the power consumption of a building below the predetermined level. The system includes a first means for reactively shedding loads based upon the current measured power consumption of the building and second means for determining the anticipated future increase or decrease of power consumption of the building and for adding and shedding loads responsive to the measured present total power consumption of the building and the anticipated future increase or decrease in power consumption of the building. By virtue of the reactive shedding of loads and the predictive adding and shedding of loads, the system of the present invention is capable of continuously maintaining the power consumption of the building below a predetermined level. In accordance with the preferred embodiment, the system determines which of the loads will be on or off during the next successive time interval and, in accordance with the alternative embodiment, the system determines which of the loads will be on or off during the present time interval.

In addition, by reactively shedding loads, the system is capable of accommodating loads which are not controlled by shedding enough controlled load to maintain the power consumption of the building below the predetermined level even though uncontrolled loads may be turned on. Also, the system of the present invention is capable of delaying the on time of a load until the load can be turned on without exceeding the predetermined power consumption level. This is accomplished by the posting of on and off requests with the system processor and arranging the system so that an on request can be delayed by the second means to alter the control of those loads by turning on those loads when the predetermined power consumption level will not be exceeded.

In addition to the foregoing, the system of the present invention also provides flexibility in assigning loads to various shed routines. Each load may be assigned a priority with respect to each of the other loads and each of the loads may be combined in a group of loads having a given priority and each load of the group may be assigned a priority with respect to each other load of the group. In this regard, each routine controls the adding and shedding of the loads in a different sequence and the processor determines which type of the multiple types of routines is assigned to each load and adds or sheds each load according to its assigned routine. As a result, the present invention provides an add/shed system which not only incorporates flexibility but in addition provides improved and distinct advantages over prior systems by providing both reactive shedding and predictive adding and shedding of loads to maintain the power consumption of a building below a predetermined level.

While particular embodiments of the present invention have been shown and described, modifications may be made, and it is therefore intended in the appended claims to cover all such modifications as may fall within the true spirit and scope of the invention.

What is claimed is:

1. An add/shed system for adding/shedding loads to maintain the power consumption of a building below a predetermined level, said system comprising:
   a plurality of loads;
   measuring means for measuring the present total power consumption of said building;
   first means for shedding selected ones of said loads responsive to said measured present total power consumption of said building to maintain the present power consumption of said building below said predetermined level; and second means for determining the anticipated future increase or decrease in power consumption of said building and for adding/shedding selected ones of said loads responsive to said measured present total power consumption of said building and said anticipated future increase or decrease in power consumption of said building for continuously maintaining the power consumption of said building below said predetermined level, wherein said second means is arranged to determine the anticipated future increase or decrease in power consumption by determining which of said loads will be required on or off during a preselected time interval and by determining which of said loads will be requested on or off during a preselected time interval.

2. A system as defined in claim 1 wherein said system is arranged to shed loads when the power consumption of said building reaches a second predetermined level, said second predetermined level being less than said predetermined level.

3. A system as defined in claim 2 wherein said system is arranged to add loads when the power consumption of said building falls to a third predetermined level, said third predetermined level being less than said second predetermined level.

4. A system as defined in claim 1 wherein said system adds/sheds loads during each of a plurality of successive discrete time intervals.

5. A system as defined in claim 4 wherein said second means is arranged for reactively shedding loads based upon power consumption in a present time interval and for predictively adding/shedding loads in the next time interval based upon anticipated increases or decreases in power consumption determined in said present time interval.

6. A system as defined in claim 1 wherein said second means is arranged for delaying the adding of a given load until said given load can be added without the power consumption of said building exceeding said predetermined level.

7. A system as defined in claim 1 wherein each of said loads is assigned a priority with respect to each of the other loads and wherein said first and second means adds/sheds said loads in accordance with said priorities.

8. A system as defined in claim 7 wherein one or more of said loads are combined in a group of loads having a given priority and wherein each load of said group is assigned a priority with respect to each other load of said group.

9. A system as defined in claim 1 wherein each said load is assigned to at least one of multiple types of add/shed sequences, each sequence controlling the adding/shedding of said loads in a different order, and wherein said system includes means for determining which type of the multiple types of add/shed sequence is assigned to each said load.

10. A system as defined in claim 9 wherein said second means is further arranged for adding/shedding each load according to its assigned sequence.

11. A system as defined in claim 1 wherein said system adds/sheds loads during each of a plurality of successive discreet time intervals, and wherein said second means is arranged to determine the anticipated future increase or decrease in power consumption by determining which of said loads will be required or requested on or off during a present time interval.

12. A system as defined in claim 11 wherein said second means is arranged for reactively shedding loads based upon power consumption in a present time interval and for adding/shedding loads during said present time interval based upon anticipated power consumption decreases or increases determined in said present time interval.

13. An add/shed system for adding loads by an ON command for each said load and shedding loads by an OFF command for each said load to maintain the energy consumption of a building below a predetermined level, each load being assigned to at least one of multiple types of add/shed routines, each routine controlling the adding and shedding of said loads in a different sequence, said system comprising:

a plurality of loads; and processor means connected to said plurality of loads and adapted to be connected to a power meter for determining which of said plurality of loads should be added or shed to maintain the energy consumption of said building below said predetermined level and for determining which type of the multiple types of add/shed routines is assigned to each load, said processor means for adding or shedding each load according to its assigned routine, said processor means also including means for determining in advance of a load ON command for a given load when the adding of said given load will cause the energy consumption of said building to increase above said predetermined level.

14. A system as defined in claim 13 wherein said processor means is further adapted for determining the increase in energy consumption of said building represented by said given load in advance of said ON command for said given load and for shedding one or more of the other loads having a total energy consumption at least equal to the increase in energy consumption of said building represented by said given load prior to said ON command for said given load to eliminate said increase in energy consumption of said building represented by said given load when said given load is added.

15. A system as defined in claim 13 wherein said loads subject to said ON and OFF commands comprise controlled loads, wherein said system further includes non-controlled loads, and wherein said processor is further adapted to monitor the total energy consumption of said building for determining when one or more of said non-controlled loads cause the energy consumption demand of said building to exceed a predetermined level and for shedding one or more of said controlled loads to reduce the energy consumption demand of said building to below said predetermined level.

16. A system as defined in claim 13 wherein said processor is further adapted to delay the ON command for a given load to maintain the energy consumption of said building below said predetermined level.

17. A system as defined in claim 16 wherein said processor is arranged to delay the ON command of said given load until enough of the other loads have been shed to permit said given load to be added without increasing the energy consumption of said building to above said predetermined level.

18. A system as defined in claim 13 wherein said processor means is further arranged to provide a schedule of the ON and OFF command times for said loads and is further arranged for dynamically altering said ON and OFF command schedule in response to the energy consumption of said building.

19. A method of adding/shedding selected ones of a plurality of loads to maintain the power consumption of a building below a predetermined level, said method including the steps of:

measuring the present total power consumption of said building;

reactively shedding selected ones of said loads responsive to said measured present total power consumption of said building to maintain the present power consumption of said building below said predetermined level;

determining the anticipated future increase or decrease in power consumption of said building by determining which of said loads will be required on or off during a preselected time interval and by determining which of said loads will be requested on or off during a preselected time interval; and predictively adding/shedding selected ones of said loads responsive to said measured present total power consumption of said building and said anticipated future increase or decrease in power consumption of said building to continuously maintain the power consumption of said building below said predetermined level.

20. A method as defined in claim 19 wherein said loads are shed when the power consumption of said building reaches a second predetermined level, said second predetermined level being less than said predetermined level.

21. A method as defined in claim 19 wherein said loads are added when the power consumption of said building falls to a third predetermined level, said third predetermined level being less than said second predetermined level.

22. A method as defined in claim 19 wherein said loads are added or shed during each of a plurality of successive discreet time intervals, and wherein the anticipated future increase or decrease in power consumption is determined by determining which of said loads will be required or requested on or off during the next successive time interval.

23. A method as defined in claim 22 wherein said loads are reactively shed based upon power consumption in a present time interval and wherein said loads are predictively shed/added in the next time interval based upon anticipated decreases or increases in power consumption determined in said present time interval.

24. A method as defined in claim 18 including the further step of delaying the adding of a given load until said given load can be added without the power consumption of said building exceeding said predetermined level.

25. A method as defined in claim 18 including the further steps of assigning a priority with to each said load with respect to each of the other loads and adding/shedding said loads in accordance with said priorities.

26. A method as defined in claim 24 including the further steps of combining one or more of said loads in a group of loads, assigning a given priority to said group of loads, and assigning to each load of said group of loads a priority with respect to each other load of said group.

27. A method as defined in claim 18 including the further steps of assigning to each said load at least one of multiple types of add/shed sequences, each sequence controlling the adding/shedding of said loads in a different order, and determining which type of the multiple types of add/shed sequence is assigned to each said load.

28. A method as defined in claim 26 including the further step of adding/shedding each load according to its assigned sequence.

29. A method as defined in claim 18 wherein said loads are added/shed during each of a plurality of successive discreet time intervals, and wherein the anticipated future increase or decrease in power consumption is determined by determining which of said loads will be required or requested on or off during a present time interval.

30. A method as defined in claim 28 wherein said loads are reactively shed based upon power consumption in a present time interval and wherein said loads are predictively shed/added during said present time interval based upon anticipated power consumption decreases or increases determined in said present time interval.

31. An add/shed system for adding/shedding loads to maintain the power consumption of a building below a predetermined level, said system comprising:

a plurality of loads;

measuring means for measuring the present total power consumption of said building;

first means for shedding selected ones of said loads responsive to said measured present total power consumption of said building to maintain the present power consumption of said building below said predetermined level;

a second plurality of loads;

control means for controlling the turning on and turning off of said second plurality of loads; and second means for determining the anticipated future increase or decrease in power consumption of said building and for adding/shedding selected ones of said loads responsive to said measured present total power consumption of said building and said anticipated future increase or decrease in power consumption of said building for continuously maintaining the power consumption of said building below said predetermined level wherein said second means is further arranged to alter the control of said second plurality of loads by delaying the turning on of said second plurality of loads by said control means when the turning on of said second plurality of loads would cause the power consumption of said building to exceed said predetermined level.

32. A system as defined in claim 31 wherein said control means is arranged to transmit a request to said second means prior to the turning on or turning off of said second plurality of loads.

* * * * *